United States Patent [19]

DiGiacomo et al.

[11] 4,114,260
[45] Sep. 19, 1978

[54] INDUSTRIAL BATTERY STACK, AND APPARATUS AND METHOD FOR STACKING, ALIGNING AND BURNING SAME

[75] Inventors: Hector L. DiGiacomo, Lafayette Hill; John A. Sacco, Wernersville, both of Pa.

[73] Assignee: General Battery Corporation, Reading, Pa.

[21] Appl. No.: 783,959

[22] Filed: Apr. 1, 1977

Related U.S. Application Data

[62] Division of Ser. No. 652,715, Jan. 27, 1976, abandoned.

[51] Int. Cl.$^2$ .................................. H01M 10/14
[52] U.S. Cl. .................................. 29/623.1; 29/730; 429/136
[58] Field of Search .............. 429/129, 130, 131, 136, 429/138, 142, 143, 145, 146, 96, 209, 225; 29/623.1, 730; 214/6 M, 7

[56] References Cited

U.S. PATENT DOCUMENTS 2,808,800  10/1957  Winkel ........................... 228/58 X Primary Examiner—Anthony Skapars
Attorney, Agent, or Firm—Benasutti Associates, Ltd.

[57] ABSTRACT

A novel industrial battery stack is disclosed, wherein positive plates which have been longitudinally wrapped with a perforate or semi-perforate material are accurately aligned with respect to the negative plates and separators in the stack during the stacking operation. The novel spacing members of the present invention have a generally U-shaped cross section for engaging through the wrapping a portion of the positive plate adjacent to the longitudinal edges of that plate. Projections protruding substantially from the base of the "U" provide the proper distance between the edge of the wrapped plate and an adjacent longitudinal surface. During the stacking and burning operation, this longitudinal surface comprises the back wall of a novel industrial battery plate holder. Following the burning of the battery stack and its subsequent assembly into an appropriate industrial battery case, the spacing member or members act to protect the positive battery plates and retain them in their proper alignment during the operation of the battery. Applicants have also provided a novel apparatus and method for stacking, aligning and burning industrial battery stacks which comprises a battery stack holder having several upstanding walls which define a stacking column having a coplanar terminus. An adjustably locatable partition within said stacking column may be disposed at any of a plurality of positions parallel with respect to the coplanar terminus so that the battery stack holder may be adjusted for any of a variety of given sizes of plates and separators. The battery plates and separators may then be stacked into the battery stack holder so that only the plate lugs extrude beyond the coplanar terminus. A dam is insertable along the top of the battery plates and across the top of the upstanding side walls of the battery stack holder to facilitate the rapid efficient burning of the industrial battery stack. This method is enhanced by the prior axial compression of the battery stack which effectively reduces the volume of the stack, and consequently the size of the industrial battery case required to contain a given amount of active battery material.

1 Claim, 9 Drawing Figures

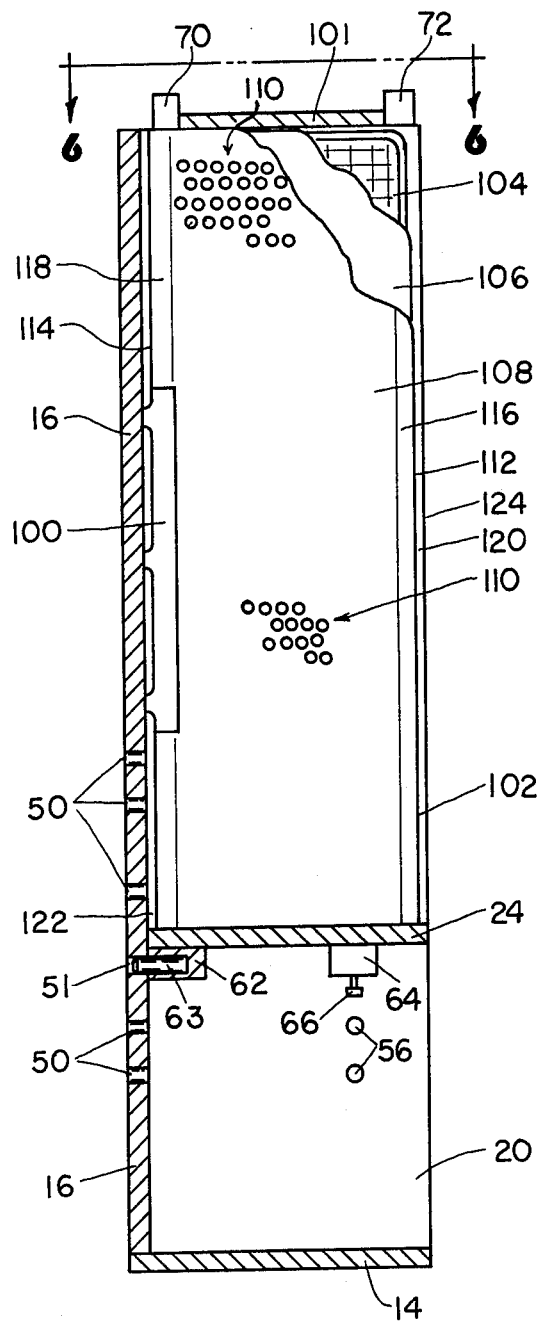
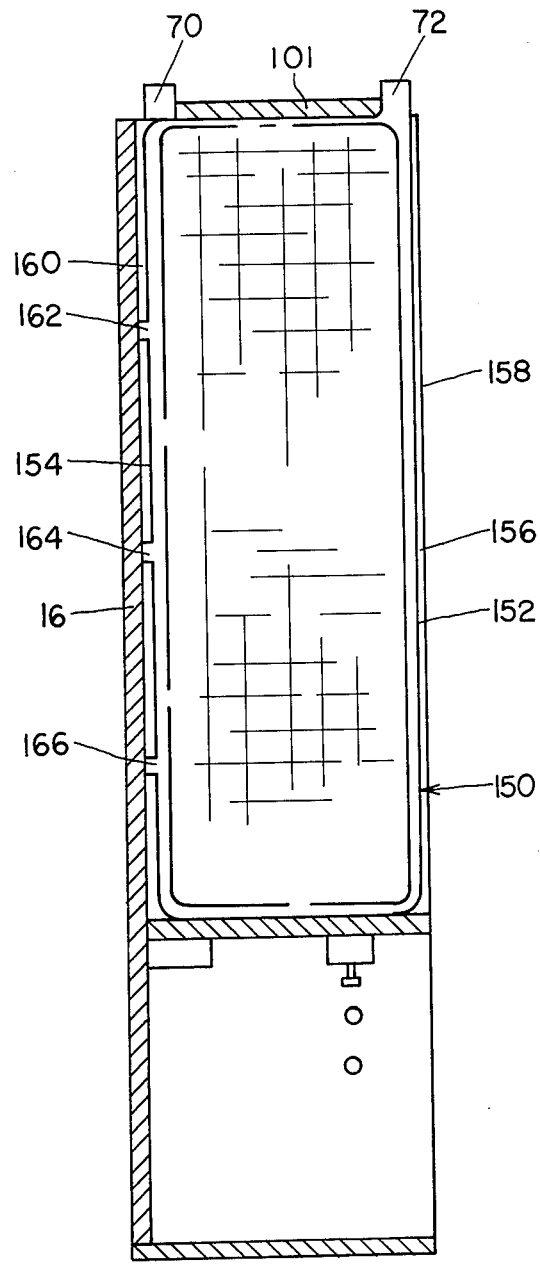
fig. 3
fig. 4

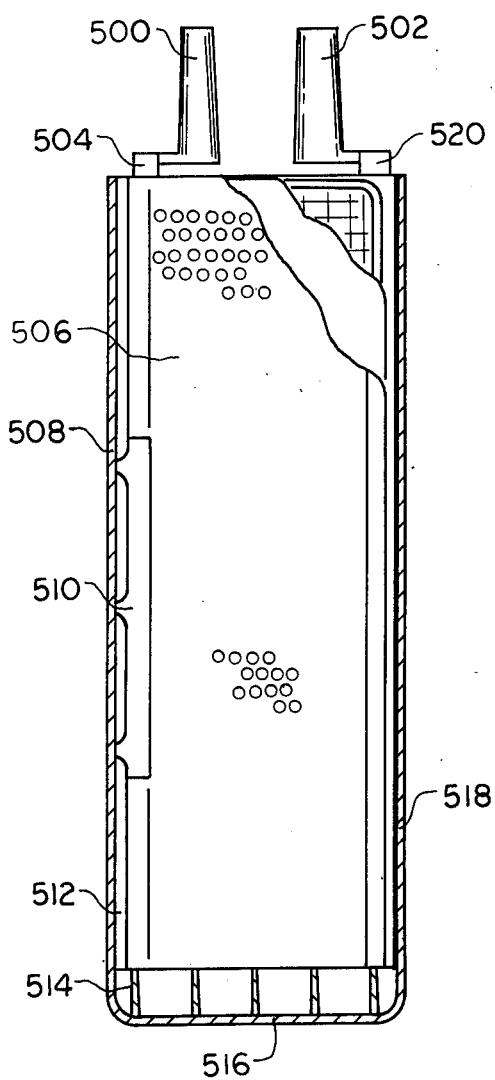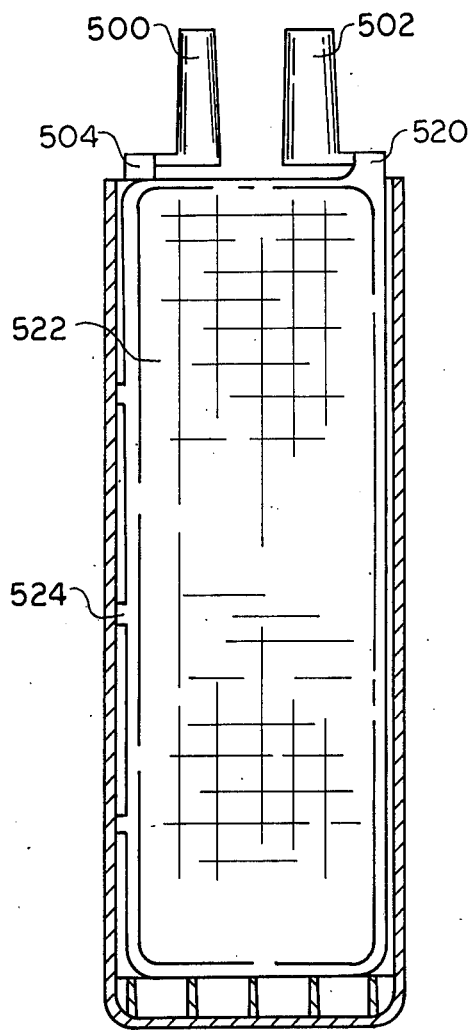

INDUSTRIAL BATTERY STACK, AND APPARATUS AND METHOD FOR STACKING, ALIGNING AND BURNING SAME

This is a division of application Ser. No. 652,715 filed Jan. 27, 1976, now abandoned.

BACKGROUND OF THE INVENTION

The present invention relates generally to the field of industrial battery stacks, and more particularly, to industrial battery stacks wherein the positive plates have been wrapped with a semi-perforate inert material for the purpose of preserving and extending the life of these plates.

It has long been known to the art that one method of effectively positioning plates of a storage battery is to provide projections protruding from the plates which are cast therein for the purpose of spacing those plates during stacking and subsequent insertion into the storage battery case. Similar projections may also be disposed along the bottom of the battery plates for the purpose of providing "feet" which are useful in holding the bulk of the battery plate material away from a surface upon which may accumulate residues which, if allowed to contact the battery plate material, might tend to shorten the useful life of the battery. In the construction of automotive batteries, these projections which are formed along the longitudinal edges of the battery plates used in the battery stack are normally included on both the positive and negative plates. In order to avoid shorting which might be caused by buckling, these projections are often offset so that the various projections within the stack of each positive and negative plates are coaxial, but are spaced apart longitudinally by distance sufficient to minimize the likelihood of shorting between plates. One arrangement similar to that described with respect to both positive and negative plates and separators is disclosed in U.S. Pat. No. 3,294,258 entitled Apparatus for Aligning the Plates and Separators of a Battery Stack. Heretofore it has been common to stack battery plates, such as those shown in U.S. Pat. No. 3,294,258, in an alignment box in order to produce a battery stack which may then be transferred out of the alignment box for the purpose of forming battery straps and lugs thereon, either by burning, casting, or some other method known to the art.

In the stacking and burning of industrial battery plates, various difficulties have been encountered which differ substantially from those encountered in the production of battery stacks intended for automotive or other non-industrial uses. In particular, the currents produced within a typical industrial battery far exceed those normally encountered in an automotive battery, and therefore, the stresses which are encountered by the battery plates, and particularly, the positive plates, are substantially increased in the typical industrial battery. One method of improving the durability of the positive plates incorporated into an industrial battery is that of wrapping each of the positive plates with an inert wrapping film, such as polyvinyl chloride, which wrapping film is perforated in the areas over the broad faces of the positive plates, but which is inperforate in the portion of the wrapping material which overlaps the longitudinal edges of the positive plates. It has been found that by wrapping the positive plates of an industrial battery in this manner, that the likelihood of treeing and the damages which might be expected from warping or shedding are kept to a minimum. Unfortunately, the wrapping of positive battery plates in an industrial battery stack brings with it certain problems relating to the stacking and positioning of those battery plates, not only initially within the battery stack prior to burning, but also subsequently after the assembly of the battery stack into the case in terms of properly aligning the positive plates with respect to the adjacent negative plates and separators, as well as with respect to the side walls of the battery. Projections extending from the longitudinal edges of a positive battery plate are furthermore not practical, due to the fact that the wrapping of these battery plates with the above described inert material will be interfered with. Furthermore, the wrapping of the positive plates, together with the large size of those plates as normally encountered in the production of a typical industrial battery makes it very difficult to efficiently utilize a given unit volume within an industrial battery case. That is, unlike automotive batteries, industrial battery plates, due to their relatively greater size and weight, and the attendant dimensional irregularities which may be cast or formed therein during processing, prevents the typical industrial battery stack from being moved as compactly as that normally expected in the automotive battery production.

SUMMARY OF THE INVENTION

The present invention provides a novel industrial battery stack which possesses the advantages of having wrapped positive plates while preventing the disadvantages of non-alignment which are normally attendant therewith. Furthermore, a novel industrial battery stack box is provided for stacking and aligning, and the subsequent burning of the industrial battery stack which eliminates the necessity of transferring the battery stack to a separate apparatus prior to its burning and subsequent assembly. Additionally, novel compression means are provided within the stacking and aligning mechanism which allows the industrial battery stack to have the lugs formed thereon while in a compressed condition.

Accordingly, one of the primary objects of the present invention is to provide a novel battery stack for industrial use, wherein the wrapped positive plates are aligned with respect to the negative plates and separators by means of a novel spacing member. Another object of the present invention is the provision of a novel battery stack box adapted for utilization with any of a variety of given sizes of battery plates and separators, wherein the burning of the battery plate lugs may be accomplished within the battery stack while it is in a compressed condition.

Another aim of the present invention is the provision of a battery stack box wherein any of a variety of given sizes of battery plates and separators may be disposed therein such that the upper surface of the battery stack is disposed within a coplanar terminus formed by the remote ends of the upstanding walls of the battery box, such that a dam may be placed thereon so that only the protruding lugs of the battery stack to be burned are readily acceptable during the burning operation.

These and other objects of the present invention will be apparent from the following description.

BRIEF DESCRIPTION OF THE DRAWINGS

FIG. 3 is a cross section of the battery stack and apparatus shown in FIG. 2, taken as indicated by the lines and arrows 3—3 in FIG. 2. FIG. 3 shows the novel spacing member of the present invention disposed between a positive wrapped battery plate and the back wall of the battery stack box. The semi-perforate material used to wrap the positive plate is shown broken away in the upper righthand corner of the plate as viewed in FIG. 3.

FIG. 4 is a cross section similar to FIG. 3, in which a negative plate is exposed and shown disposed within the battery stacking box of the present invention.

FIG. 8 is a cross section of an industrial battery jar showing the novel spacing member of the present invention disposed against the battery jar wall.

FIG. 9 is a cross section of an industrial battery jar showing the interrelationship between a negative plate of the battery stack disposed therein and the wall of the industrial battery jar.

DETAILED DESCRIPTION OF THE DRAWINGS

Figure 1:
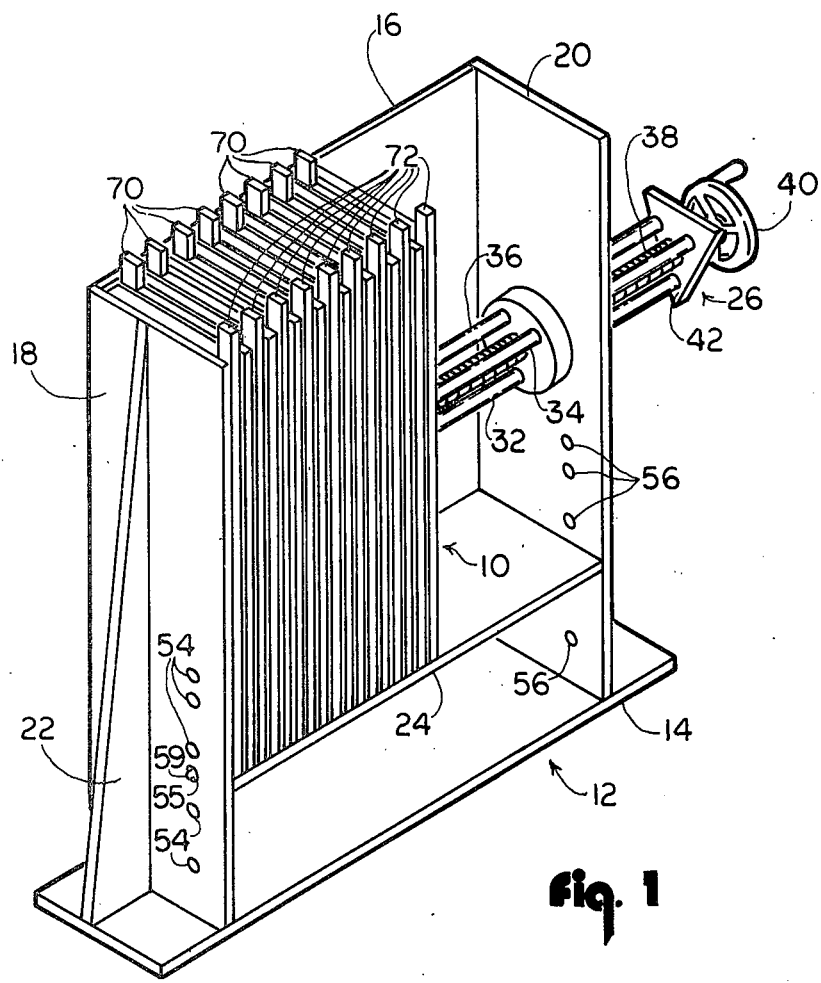
FIG. 1 is a perspective view of the battery stack box of the present invention showing the battery stack of the present invention disposed therein in a compressed condition.

Although specific forms of the invention have been selected for illustration in the drawings, and the following description is drawn in specific terms for the purpose of describing these forms of the invention, this description is not intended to limit the scope of the invention which is defined in the appended claims.

Figure 2:
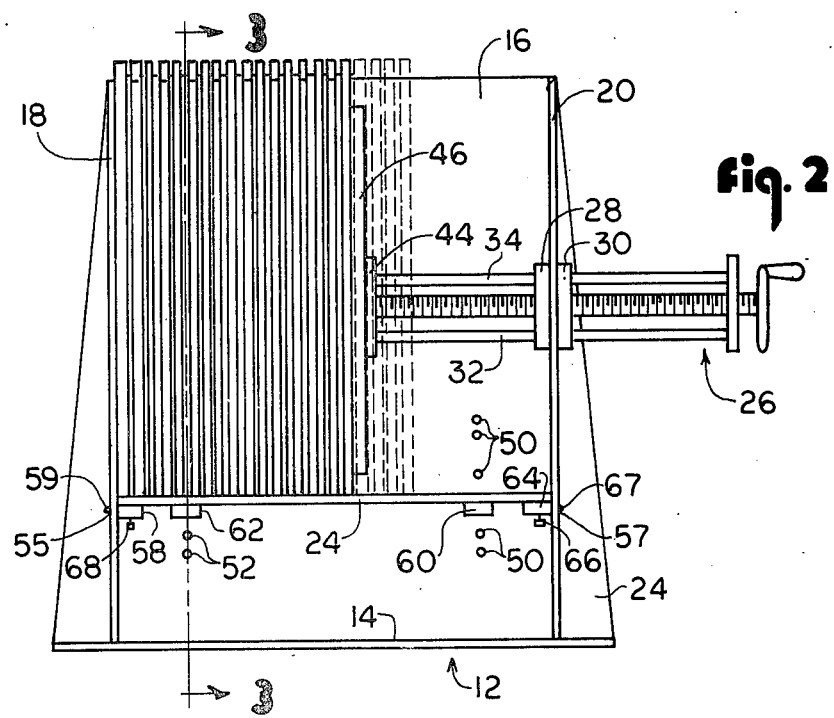
FIG. 2 is a front plan view of the apparatus and battery stack shown in FIG. 1 in which the original condition of the battery stack prior to compression is shown in phantom.

Referring now to FIG. 1, the battery stack of the present invention, designated generally 10, and the battery stack box of the present invention, designated generally 12, are represented in perspective. The battery stack box of the present invention comprises a base 14, an upstanding back wall 16 extending from the base, and two upstanding end walls 18 and 20 extending from the base 14 and back wall 16. Triangular braces 22 and 24 are shown in the figures welded to the end walls 18 and 20 and to the base 14 to provide additional rigidity to the end walls which is sufficient to counteract the compressive forces to be contained therein. Partition 24 is disposed within the stacking column, which is defined by the end walls 18 and 20 and the back wall 16. As seen in FIG. 2, the upper end of the stacking column is bisected by a coplanar terminus which is defined by the remote ends of the end walls 18 and 20 and the back wall 16. A ram, designated generally 26, extends generally parallel to the back wall along an axis extending axially with respect to the battery stack 10. The ram 26 pierces end wall 20 and is held rigidly with respect to that end wall by cylindrical bushings 28 and 30 which are bored to receive guide rods 32, 34 and 36, which are journaled therein. At substantially the center of cylindrical bushings 28 and 30 is disposed a threaded bore adapted to receive a threaded rod 38, which is rigidly attached to driving wheel 40. A triangular guide plate 42 is welded to the ends of guide rods 32, 34 and 36, and is bored to allow threaded rod 38 to pass therethrough. The end of the ram within the battery stacking column has disposed thereon compression plates 44 and 46, which are adapted to transfer the forces created by the ram equally to the battery stack 10, which force is generally opposed by end wall 18 as braced by triangular brace 22. As seen in FIG. 2, compression plate 44 and triangular guide plate 42 are each welded to guide rods 32, 34 and 36, which coact with the bores within cylindrical bushings 28 and 30 in order to maintain the compression plate 46 parallel to end wall 18. After placing the desired number of industrial battery plates and separators within the stacking column, the ram 26 is manually activated by means of driving wheel 40 to force the battery stack into a compressed condition, as represented in FIG. 2 showing the original position of the battery stack in phantom prior to its compression by means of the ram 26.

The battery stacking column is bisected on a second plane which is parallel to the coplanar terminus described above by partition 24. Partition 24, which acts as the floor of the battery stacking box during the stacking and burning process, is disposed within the battery stacking column by means of engagement means for engaging the end walls 18 and 20 and back wall 16 of the battery stack box 12. This engagement means comprises spring biased and pin means for engaging holes defined in the end walls 18 and 20 and back wall of the battery stack box. Referring now to FIGS. 1 and 2, it may be seen that at the various positions which would correspond to the vertical sizes of battery plates and separators to be stacked, perforations or holes are defined in the end walls 18 and 20 and back wall 16 of the case. In particular, in end wall 18 holes 54 and 55 are shown; in end wall 20, holes 56 and 57 are illustrated; and in back wall 16 holes 50 and 52 are shown. Spring biased means 58 and 64 are shown rigidly attached to the underside of partition 24. These spring biased means comprise pins disposed within a plane parallel to the coplanar terminus and oriented transversely with respect to the adjacent wall which is to be pierced thereby. Tabs 66 and 68 are shown in FIG. 2 for disengaging the pins, which are somewhat tapered, from the appropriate end walls. Pin means 62 and 60 do not require spring biasing, although spring biasing may nonetheless be provided, since upon retraction of pins 59 and 67 the partition 24 may be freely moved along an axis transverse to the back wall 16.

Referring now to the positioning of the plates and separators within the battery stack box of the present invention, FIGS. 1 and 2 clearly illustrate that the partition 24 is to be positioned within the battery stacking column by engaging the appropriate holes defined in the end walls and back wall of the box so that the upper edge of each of the plates and separators, exclusive of the plate lugs, is disposed within the coplanar terminus defined by the ends of the side walls 18 and 20 and back wall 16 which are most remote from the partition 24. As seen in FIGS. 1 and 2, the lugs of the positive plates 70 and of the negative plates 72 protrude above the coplanar terminus and are therefore easily accessible for burning.

Referring now to FIG. 3, which is a cross section of the apparatus and battery stack shown in FIG. 2 taken as indicated by the lines and arrows 3—3 of FIG. 2, a wrapped positive plate in accordance with the present invention is shown including the novel spacing member 100 which is disposed along one of the longitudinal edges of the positive battery plates designated generally 102. Engagement means comprising engagement block 62 is shown having pin 63 fixedly mounted therein, which, as shown in FIG. 3, is adapted to pierce hole 51 defined in back wall 16. Spring bias engagement means 64 with finger tab 66 is also shown fixedly engaging the underside of partition 24. Once the upper edge of each of the plates and separators, exclusive of the plate lugs, is disposed within the coplanar terminus defined by the ends of the side walls and back wall 16, a dam 101 may be slipped between the upstanding lugs 70 and 72, which dam need not rest entirely upon the plates and separators, but rather may be supported by resting upon either or both of the end walls. Consequently, a relatively heavy dam may be used which adequately protects the plates and separators from shorting, which might be caused by unwanted flow of molten lead, without the attendant fear that use of such a dam might inadvertently damage the upper surfaces of the plates and separators.

Referring again to positive plate 102, which is shown in FIG. 3, the semi-perforate wrapping material may be seen to envelope the positive plate material 104 which is exposed where the two layers 106 and 108 of the semi-perforate material are broken away. The perforations in material layers 106 and 108 are represented by representative holes shown in FIG. 3, which holes are generally designated in FIG. 3 by reference numerals 110. Along each of the longitudinal edges 112 and 114 of the positive battery plate designated generally 102 shown in FIG. 3, is a solid portion 116 and 118 of the wrapping material used to envelope the positive plates. Overlapping portions 120 and 122 of the separator designated generally 124 immediately adjacent to positive plate 102 are shown protruding from behind the positive plate designated generally 102. The longitudinal edge of the separator 124 which is adjacent to portion 122 of that separator is seen in FIG. 3 abutting the surface of back wall 16, which is adjacent to the battery stacking column. In the absence of spacing member 100 shown in FIG. 3, upon stacking of positive plates designated generally 102 into the stacking column, the longitudinal edge 114 of the positive plate would also abut the inner surface of back wall 16.

Referring now to FIG. 4, which is a cross section similar to FIG. 3 showing a negative plate, it will be seen that the negative plate designated generally 150 is substantially rectangular, having a protruding lug 72 disposed along its upper surface as seen in FIG. 4. The longitudinal edges 152 and 154 run parallel to the back wall 16 and are shown adjacent to an overlapping portion of the next adjacent separator designated generally 156 which is centered behind the negative plate designated generally 150, so that overlapping portions 158 and 160 will protrude equally beyond edges 152 and 154 of the negative plate. Registry ears 162, 164 and 166 are cast into negative plates designated generally 150, which ears are intended to contact the inner surface of back wall 16 and to thereby space negative plate 150 away from back wall 16 to thereby precisely align negative plate 150 and the other negative plates which are similarly constructed in a battery stack with the positive plates of the stack.

Figure 5:
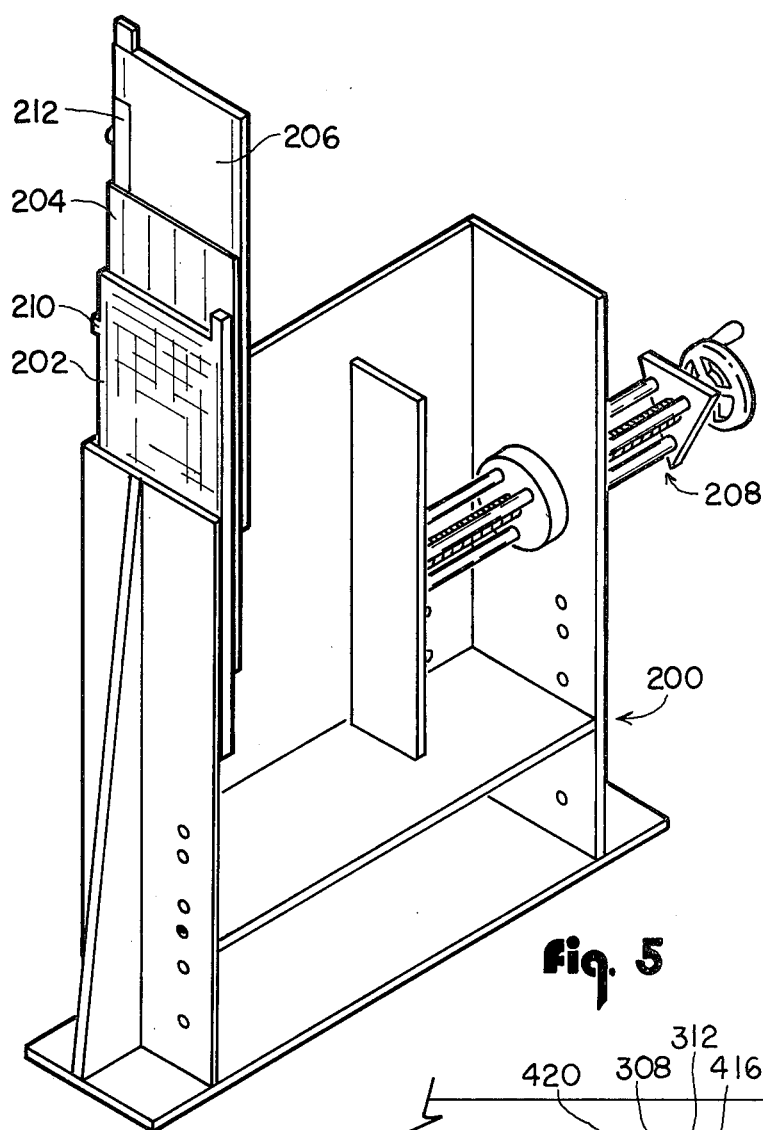
FIG. 5 is a perspective view of the battery stack box of the present invention in which a negative plate separator and positive plate incorporating the novel spacing member of the present invention are shown exploded away from the base of the box in a manner intended to represent the process of manually inserting these battery elements into the battery stacking box of the present invention.

Referring now to FIG. 5, the method of stacking negative and positive battery plates into the battery stacking box of the present invention is illustrated through a diagrammatic exploded view of the battery stacking box of the present invention designated generally 200 and a representative negative plate 202, separator 204 and positive plate 206. FIG. 5 shows the ram designated generally 208 in a generally retracted position so that the plates and separators 202, 204 and 206 can be easily inserted into the end of the box which is remote from the ram. As described above, spacing ears 210 on the negative plate 202 and spacing member 212 on the wrapped positive plate 206 will act to precisely align the negative and positive plates to produce precise separator overlap of each of the positive and negative plates, as well as to accurately align each of the positive and negative plates with respect to each other.

Figure 7:
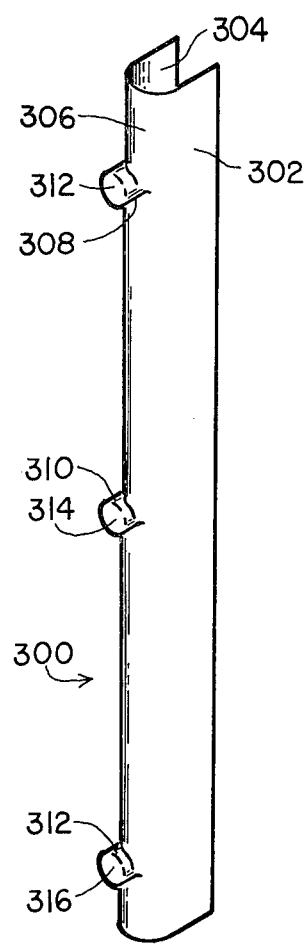
FIG. 7 is a perspective view of the novel spacing member of the present invention, shown on a greatly enlarged scale.

Referring now to FIG. 7, this view shows a greatly enlarged perspective of the spacing member designated generally 300 of the present invention. The spacing member comprises two substantially parallel side walls 302 and 304 which are connected by a curved connecting portion 306 to form a longitudinal member of substantially U-shaped cross section. A plurality of substantially cylindrical protrusions 308, 310 and 312 are formed from the curved portion 306 of the spacing member to produce capped projections terminating in circular surfaces 312, 314 and 316. Spacing member 300 may be formed from any inert material suitable for use in a battery. One such material which may be easily formed into the shape shown in FIG. 7 is polyvinyl chloride.

Figure 6:
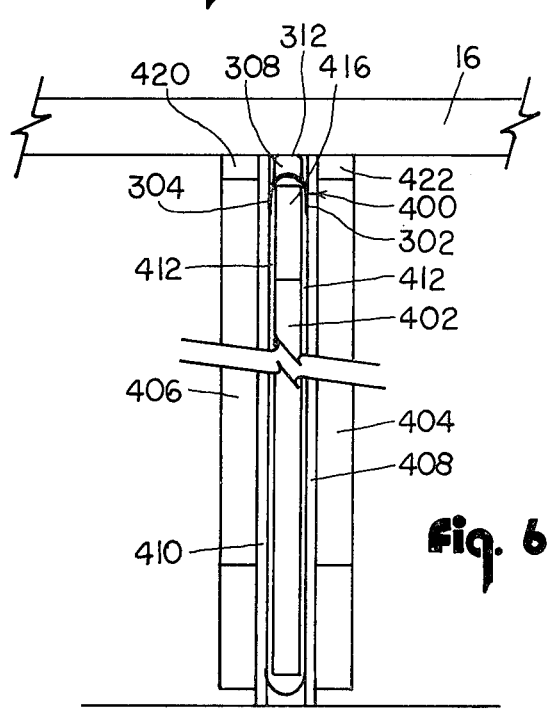
FIG. 6 is a greatly enlarged foreshortened top view of the battery stack and apparatus as shown in FIG. 3, taken as indicated by the lines and arrows 6—6 in FIG. 3.

Referring now to FIG. 6, the location and engagement of the spacing member designated generally 400 is shown in association with a positive plate 402, two negative plates 404 and 406, two spacers 408 and 410, and the positive plate wrapping material 412. The spacing member designated generally 400 is seen exerting a clamping action by means of the engagement of a longitudinal end portion 416 of the positive plate 402, which clamping action is effected by the walls 302 and 304 of the spacing member, which may be seen to be slightly distended by its introduction around the wrapping material 412 which is disposed over the longitudinal end portion 416 of the plate. The cylindrical portion 308 of the spacing member and the circular terminal surface 312 are shown disposed against the inner surface of back wall 16 of the battery stacking box of the present invention, so that the overlap of the separators 408 and 410 beyond the longitudinal edges of the positive plate 402 is identical on either edge of the positive plate 402. The projecting ears 420 and 422 of negative plates 406 and 404 respectively, similarly space the negative plates 404 and 406 away from the inner surface of back wall 16 to similarly dispose the negative plates precisely with respect to the separator overlap and also to bring the positive and negative plate material into precise alignment with respect to each other.

Heretofore, it has not been possible to burn industrial battery stacks having wrapped positive plates in the compressed condition, since the formation of straps along the upper terminal edge of the battery stack in the compressed condition tends to clamp the separators therebetween, which separators during the normal stacking operation are not centered with respect to the longitudinal axis of the plates. When external compression, such as the compression produced by the ram on the plates, is relieved, even the accordion-type tendency of the lower extremities of the plates to resume the original position shown in FIG. 2 is not sufficient to allow the repositioning of the separators with respect to the remainder of the battery stack. Consequently, the use of spacing member 100, in particular, in combination with spacing ears located on the negative plates, results in a prealigned battery stack, which may be burned in a compressed condition and in which there is no further repositioning necessary prior to the introduction of the burned battery stack into the intended industrial battery case. Furthermore, it will be noted that the use of an inert material to form the spacing member which engages the positive plates makes it unnecessary to stagger the projections extending from that spacing member with respect to the spacing ears located on the negative plates. Consequently, the spacing projections can be centrally located with respect to the longitudinal axis of the various plates without increasing the likelihood of shorting. Furthermore, the use of two or more spacing members on each of the positive plates on both longitudinal edges of each positive plate will enable the positive plate to retain its proper spacing when inserted into the final battery case.

Referring now to FIGS. 8 and 9, a novel industrial battery in accordance with the present invention is illustrated, wherein a spacing member 510 is shown engaging the longitudinal edge of a wrapped positive battery plate 506, which is a portion of a battery stack disposed within an industrial battery jar 518 having a bottom 516 with ribs 514 disposed thereon to hold the battery plates away from the lower surface of the battery jar. A spacer 512 is shown in FIG. 8 protruding beyond the longitudinal edge of the positive battery plate 506, which spacer 512 engages the side walls of the battery jar 518. Since, at this stage, burning is complete, plate lugs 504 and 520 are shown fused with battery terminals 500 and 502. In FIG. 9, which is a cross section of the same battery jar taken to expose a negative plate, projecting ear 524 of negative battery plate 522 is illustrated showing the use of that spacing means against the side of the battery jar.

It will be understood that various changes in the details, materials and arrangement of the parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent Office, and is not intended to limit the scope of the invention described and claimed herein.

What is claimed is:

1. A method of stacking wrapped battery plates with respect to adjacent and discrete overlapping battery separators comprising the steps of:
    (a) providing at least one substantially planar surface against which said battery plates are to be stacked;
    (b) providing a plurality of wrapped battery plates to be stacked;
    (c) applying over the wrapping of each of said wrapped plates at least one spacing member having a substantially U-shaped cross section for engaging at least one vertical wrapped edge of each of said wrapped battery plates, said spacing member having projections protruding therefrom a distance sufficient to provide the desired overlap of said separators beyond said plates; and
    (d) positioning said wrapped battery plates and separators against said surface to thereby produce a properly aligned battery stack wherein said separators uniformly overlap said battery plates.

* * * * *